United States Patent
Shanks

(10) Patent No.: US 9,840,907 B2
(45) Date of Patent: Dec. 12, 2017

(54) DATA COMMUNICATIONS SYSTEM

(71) Applicant: ZENITH OILFIELD TECHNOLOGY LIMITED, Thainstone Business Park, Inverurie, Aberdeenshire (GB)

(72) Inventor: David Sirda Shanks, Aberdeen (GB)

(73) Assignee: Zenith Oilfield Technology Limited, Aberdeenshire (GB)

(*) Notice: Subject to any disclaimer, the term of this patent is extended or adjusted under 35 U.S.C. 154(b) by 72 days.

(21) Appl. No.: 14/383,790

(22) PCT Filed: Feb. 28, 2013

(86) PCT No.: PCT/GB2013/050512
§ 371 (c)(1),
(2) Date: Sep. 8, 2014

(87) PCT Pub. No.: WO2013/132234
PCT Pub. Date: Sep. 12, 2013

(65) Prior Publication Data
US 2015/0109139 A1    Apr. 23, 2015

(30) Foreign Application Priority Data

Mar. 8, 2012 (GB) .................................. 1204126.5
May 24, 2012 (GB) .................................. 1209141.9
(Continued)

(51) Int. Cl.
*G01V 3/00* (2006.01)
*E21B 47/12* (2012.01)
(Continued)

(52) U.S. Cl.
CPC ............ *E21B 47/12* (2013.01); *E21B 43/128* (2013.01); *H04B 3/54* (2013.01); *H04B 2203/5466* (2013.01); *H04B 2203/5475* (2013.01)

(58) Field of Classification Search
CPC .... H04B 2203/5458; H04B 2203/5466; H04B 2203/5475; H04B 2203/5491; H04B 3/54;
(Continued)

(56) References Cited

U.S. PATENT DOCUMENTS 3,959,767 A      5/1976  Smither et al.
4,157,535 A  *   6/1979  Balkanli ............... G08C 19/14
                                                         166/250.01
(Continued)

FOREIGN PATENT DOCUMENTS

CN    1152784 A    6/1997
CN    1988404 A    6/2007
(Continued)

OTHER PUBLICATIONS

Chinese Office Action issued in connection with corresponding CN Application No. 201380012881.2 dated Jun. 30, 2015.
(Continued)

*Primary Examiner* — Amine Benlagsir
*Assistant Examiner* — Adnan Aziz
(74) *Attorney, Agent, or Firm* — GE Global Patent Operation

(57) ABSTRACT

A data communications system and associated method of data transmission for transmitting data over a three phase power system between a surface and a sub-surface location for an arrangement such as an oil field electrical submersible pump, on each of the three conductors of a three phase cabled connection with an isolation mechanism operable to isolate any given conductor when a fault associated with that (Continued)

conductor is detected. With the system providing a separate AC signal and data transfer on each conductor isolation can be achieved while enabling continued operation.

25 Claims, 3 Drawing Sheets

(30) Foreign Application Priority Data

| Jul. 4, 2012 | (GB) | 1211806.3 |
|---|---|---|
| Aug. 28, 2012 | (GB) | 1215281.5 |

(51) Int. Cl.
*H04B 3/54* (2006.01)
*E21B 43/12* (2006.01)

(58) Field of Classification Search
CPC ...... E21B 43/128; E21B 43/385; E21B 47/12; E21B 47/122
USPC .................................................. 340/854.9
See application file for complete search history.

(56) References Cited

U.S. PATENT DOCUMENTS

| 4,739,325 | A | | 4/1988 | MacLeod | |
|---|---|---|---|---|---|
| 4,788,545 | A | | 11/1988 | Farque | |
| 5,334,877 | A | * | 8/1994 | Mohan | H02J 9/062 |
| | | | | | 307/105 |
| 5,493,288 | A | | 2/1996 | Henneuse | |
| 5,515,038 | A | | 5/1996 | Smith | |
| 5,677,974 | A | | 10/1997 | Elms et al. | |
| 5,941,307 | A | | 8/1999 | Tubel | |
| 5,995,020 | A | | 11/1999 | Owens et al. | |
| 6,260,615 | B1 | * | 7/2001 | Dalrymple | E21B 36/04 |
| | | | | | 166/302 |
| 6,396,415 | B1 | | 5/2002 | Bulmer | |
| 6,459,557 | B1 | * | 10/2002 | Haensgen | H02H 3/006 |
| | | | | | 361/78 |
| 6,587,037 | B1 | | 7/2003 | Besser et al. | |
| 7,615,893 | B2 | | 11/2009 | Biester et al. | |
| 7,660,365 | B2 | | 2/2010 | Koga et al. | |
| 7,686,074 | B2 | * | 3/2010 | McCoy | E21B 43/128 |
| | | | | | 166/105 |
| 7,982,633 | B2 | | 7/2011 | Booker et al. | |
| 8,174,145 | B2 | | 5/2012 | Goedecke et al. | |
| 8,362,916 | B2 | | 1/2013 | Tjhang et al. | |
| 8,988,026 | B2 | * | 3/2015 | Ahmed | H02M 5/4585 |
| | | | | | 318/400.13 |
| 8,988,178 | B2 | * | 3/2015 | Deville | E21B 17/028 |
| | | | | | 336/115 |
| 2003/0133238 | A1 | * | 7/2003 | Reedy | H02H 7/262 |
| | | | | | 361/62 |
| 2003/0151977 | A1 | | 8/2003 | Shah et al. | |
| 2005/0190584 | A1 | * | 9/2005 | Hernandez-Marti | E21B 47/00 |
| | | | | | 363/34 |
| 2005/0283277 | A1 | | 12/2005 | Schulz | |
| 2006/0102341 | A1 | * | 5/2006 | Freer | H04B 3/54 |
| | | | | | 166/250.01 |
| 2006/0145833 | A1 | * | 7/2006 | Brandt | H02J 13/002 |
| | | | | | 340/538.11 |
| 2006/0152866 | A1 | * | 7/2006 | Benmouyal | H02H 3/402 |
| | | | | | 361/42 |
| 2006/0247861 | A1 | | 11/2006 | McCoy et al. | |
| 2007/0138867 | A1 | | 6/2007 | Choi et al. | |
| 2008/0112885 | A1 | | 5/2008 | Okunev et al. | |
| 2008/0272932 | A1 | * | 11/2008 | Booker | H04B 3/54 |
| | | | | | 340/854.9 |
| 2008/0273602 | A1 | | 11/2008 | Glen | |
| 2009/0021393 | A1 | * | 1/2009 | Layton | G01V 11/002 |
| | | | | | 340/854.9 |
| 2009/0044938 | A1 | * | 2/2009 | Crossley | E21B 43/128 |
| | | | | | 166/250.15 |
| 2009/0133487 | A1 | | 5/2009 | Jeffryes | |
| 2009/0250210 | A1 | * | 10/2009 | Allen | E21B 43/128 |
| | | | | | 166/250.15 |
| 2010/0194585 | A1 | * | 8/2010 | Skinner | E21B 43/128 |
| | | | | | 340/853.2 |
| 2011/0036560 | A1 | * | 2/2011 | Vail, III | E21B 28/00 |
| | | | | | 166/87.1 |
| 2011/0075304 | A1 | * | 3/2011 | Hamer | H02H 7/263 |
| | | | | | 361/47 |
| 2011/0205080 | A1 | | 8/2011 | Millot et al. | |
| 2011/0301850 | A1 | | 12/2011 | Maao | |
| 2012/0008961 | A1 | | 1/2012 | Chen et al. | |
| 2012/0026003 | A1 | | 2/2012 | Layton | |
| 2012/0037354 | A1 | * | 2/2012 | McCoy | F04D 13/10 |
| | | | | | 166/65.1 |
| 2012/0194313 | A1 | * | 8/2012 | Wohlforth | H01F 27/38 |
| | | | | | 336/170 |
| 2014/0152459 | A1 | | 6/2014 | Olson et al. | |

FOREIGN PATENT DOCUMENTS

| CN | 101015108 | A | 8/2007 |
|---|---|---|---|
| CN | 101056181 | A | 10/2007 |
| CN | 101218756 | A | 7/2008 |
| CN | 101263663 | A | 9/2008 |
| CN | 102369461 | A | 3/2012 |
| GB | 2283889 | A | 5/1995 |
| GB | 2352150 | A | 1/2001 |
| GB | 2394631 | A | 4/2004 |
| GB | 2401295 | A | 11/2004 |
| GB | 2416097 | A | 1/2006 |
| GB | 2483384 | A | 3/2012 |
| WO | 0186831 | A1 | 11/2001 |
| WO | 2008011889 | A1 | 1/2008 |
| WO | 2011072732 | A1 | 6/2011 |
| WO | 2012004000 | A2 | 1/2012 |

OTHER PUBLICATIONS

Chinese Office Action issued in connection with corresponding CN Application No. 201380012666.2 dated Jul. 1, 2015.
Unofficial English Translation of Chinese Office Action issued in connection with corresponding CN Application No. 201380012799.X dated Aug. 5, 2015.
PCT Search Report issued in connection with corresponding Application No. PCT/GB2013/050510 dated Apr. 26, 2013.
PCT Search Report issued in connection with corresponding Application No. PCT/GB2013/050508 dated Jun. 14, 2013.
PCT International Preliminary Report on Patentability issued in connection with corresponding Application No. PCT/GB2013/050511 dated Sep. 18, 2014.
PCT International Preliminary Report on Patentability issued in connection with corresponding Application No. PCT/GB2013/050512 dated Sep. 18, 2014.
Unofficial English Translation of Chinese Office Action issued in connection with related CN Application No. 201380012798.5 dated Sep. 1, 2015.
Non-Final Office Action issued in connection with related U.S. Appl. No. 14/383,719 dated Mar. 22, 2016.
U.S. Non-Final office Action issued in connection with related U.S. Appl. No. 14/383,769 dated Feb. 17, 2017.
U.S. Final Office Action issued in connection with related U.S. Appl. No. 14/383,719 dated Apr. 12, 2017.
Great Britain Office Action issued in connection with related GB Application No. 1204126.5 dated Apr. 25, 2017.
Great Britain Search Report issued in connection with related GB Application No. 1204126.5 dated Aug. 20, 2012.
U.S. Non-Final Office Action issued in connection with related U.S. Appl. No. 14/383,745 dated Aug. 10, 2016.
U.S. Non-Final Office Action issued in connection with related U.S. Appl. No. 14/383,769 dated Aug. 10, 2016.

(56) References Cited

OTHER PUBLICATIONS

U.S. Final Office Action issued in connection with related U.S. Appl. No. 14/383,719 dated Sep. 6, 2016.

* cited by examiner

DATA COMMUNICATIONS SYSTEM

BACKGROUND OF THE INVENTION

The present invention relates to data transmission to and from down hole equipment and in particular, though not exclusively, to an improved data communication system and a method of data transmission through a three phase power system between the sub-surface and a surface location.

"Down hole equipment" is understood to refer to any tool, equipment or instrument that is used in a wellbore.

Data needs to be transmitted between down-hole equipment and the surface for various reasons. For example, monitoring performance of motors/pumps; transmission of control signals for control of valves; measuring device orientation and position, and making physical measurements.

For motorised down hole equipment, such as an Electric Submersible Pump (ESP) motor system, data needs to be sent from below the equipment in a circuit that includes motor windings and the equipment's power cable which can be considered as a three phase power system. In such arrangements, as power cables are already present, there is the rationale that the cost of the solution of using these should be proportionately less than a solution where an appropriate length of communication cable is also supplied. It is also generally accepted that being able to maintain power on the down hole monitoring instrumentation when the main three phase power system is not powered up is needed, as this provides essential information in the event of pump shut downs or other major events in the well.

Thus these systems are challenging to design and operate to ensure data is successfully transmitted and an independent power supply is maintained at all times.

Due to the motor and power cable properties of a three phase power system, DC current based devices which are coupled to the power system using inductive couplings have been developed and are extensively used. Power is provided from a low current DC power supply at surface and data is transmitted to surface by modulating the current drawn from this supply.

Examples of digital and processor based devices are disclosed in U.S. Pat. No. 5,515,038; GB2283889 and U.S. Pat. No. 6,396,415. These systems utilise DC current injected onto the power signal and extracted through inductive Y-point couplings. These systems are all susceptible to failure when insulation on the power cable is lost or damaged, as any fault is in parallel with the independent power source, and the fault becomes another current modulation source thus causing signal integrity to be lost. These prior art systems are also typically either analogue in nature, thus introducing noise into the measurements or, where digital data is transmitted, it is at a very slow data rate.

AC based systems which make use of AC power and/or signal transmission have been developed to overcome these problems. However, these AC based systems introduce disadvantages of their own. A typical prior art AC based system is disclosed in U.S. Pat. No. 7,982,633 being a data communication system for use in down hole applications wherein electrical energy is supplied over a multiple-conductor power cable to an ESP motor assembly. A down hole unit is AC-coupled to the conductors of the power cable through the wye point of the ESP motor assembly. A surface unit is AC-coupled to the conductors of the power cable. Uplink communication of telemetry data occurs over an AC communication scheme supported by the down hole unit and the surface unit. Downlink communication of remote control command data occurs over a different AC communication scheme supported by the surface unit and the down hole unit. These AC communication schemes provide an independent supply of power to the down hole environment. All communication between the surface and down hole environment is accomplished through the power cable without the use of additional communication lines. Data communication is maintained in the event of a ground fault on the power cable.

The expressed intention of such prior art AC based systems is to operate when the insulation on the power cable is damaged or at least imperfect. However, a disadvantage of these systems is that when a fault in the ground insulation exists the load presented by the ESP power system may be excessively high. When such an excessive load fault exists it is necessary to completely disable the system in order to protect the instrument power system from the excessive power supply load and reduce loading on signal transmission. In U.S. Pat. No. 7,982,633 there is disclosed an arrangement where high pass filtering is used to remove the low frequency ESP motor power, typically around 25-60 Hz, applied across the down hole unit. In practice, however, the insulation fault will also pull the surface and down hole star points down toward the shorted phase. This in turn loads the downhole signal driver and consequently attenuates the recovered data signal. The level of attenuation may be sufficient to render the signal as irrecoverable and thus the system cannot function. It also loads the surface power supply and if the current loading is too high this may collapse also rendering the system inoperable.

SUMMARY OF THE INVENTION

It is therefore an object of the present invention to provide a system and method of data transmission for transmitting data over a three phase power system where the system can remain operable in the event of a heavily loaded fault.

According to a first aspect of the invention there is provided a data communications system for transmitting data over a three phase power system on a multi-conductor power cable between a surface and a sub-surface location, said data communications system comprising: a surface system module provided with a power supply providing an AC power signal coupled to each conductor of the power cable; a sub-surface system module providing a first powered module and a second powered module wherein the second powered module provides a data communications signal coupled to each conductor; the multi-conductor power cable being provided between the surface system module and the sub-surface system module to transmit the power and data communication signals; and wherein the surface system module includes an isolation unit configured to selectively isolate each conductor of the power cable.

In this way, by providing such a data communications system, whereby any given conductor can be isolated should a system overload on a given phase occur, the system can continue to provide data and power transmission.

In an embodiment, the isolation unit comprises an isolation device on each conductor. In an embodiment, each isolation device is a relay. Alternatively, each isolation device is a solid state switch. In this way, power is prevented from operating on any selected conductor, independent of any other conductor.

In an embodiment, the isolation unit comprises a detection mechanism operable to detect a system fault. In an embodiment, the detection mechanism is operable to activate the isolation devices. In an embodiment, the detection mechanism comprises a current sensor on each conductor. By providing a detection mechanism to detect a system fault which can create a system overload, action can be taken to isolate the associated conductor prior to any system damage occurring.

In an embodiment, the isolation unit comprises a tuned circuit on each conductor. In this way, the frequency of the three phase power supply can be selected to be different from the frequency of the AC power signal. In an embodiment, the sub-surface module includes a tuned circuit on the motor star point to isolate the second powered module from the first powered module.

In an embodiment, the first powered module is a motor assembly. In an embodiment, the first powered module is an ESP motor system.

In an embodiment, the second powered module is a monitoring system. In an embodiment, the monitoring system comprises one or more gauges/sensors and the data communication signal comprises data from the one or more gauges/sensors.

In an embodiment, the three phase power signal is used to power the first powered module and the AC power signal is used to power the second powered module. In this way, isolating a conductor will still allow the AC power signal to reach the second powered module and transmit data to the surface.

In an embodiment, a frequency of the three phase power signal is in the range 20-60 Hz. In an embodiment, a frequency of the AC power signal is in the range 2-5 KHz. In this way, if the multi-conductor has three conductors, for example, isolating one or two conductors will still allow the AC power signal to reach the second powered module.

In an embodiment, the power and data signals on each conductor are identical. In this way, isolating one conductor still provides other conductors on which the data and power can be transmitted. Additionally, even if a majority of the conductors are isolated, an AC power signal can still reach the gauges down hole and send data signals to the surface.

According to a second aspect of the invention there is provided a method of data transmission for transmitting data over a three phase power system between a surface and a sub-surface location, the method comprising the steps of: (a) providing a three phase power multi-conductor cable connection from the surface to the sub-surface system; (b) coupling an AC power signal equally to each conductor of the three phase power cable connection; (c) coupling a data signal to each conductor of the cable connection; and (d) selectively isolating a conductor of the three phase power cable connection.

In this way, any given conductor can be isolated should a system overload on that given conductor occur, so that data and the AC power transmission can be maintained.

In an embodiment, the method includes the step of determining a fault on each conductor. In an embodiment, the conductor is isolated in response to the fault determination. In this way, damage is prevented to the sub-surface system when a fault occurs. The step of determining the fault may include the step of monitoring current on each conductor.

In an embodiment, the method includes the step of tuning the frequency of the three phase power supply to be different from the frequency of the AC power signal. In this way, an ESP motor system can be powered separately from a monitoring system at the sub-surface location. In an embodiment, the frequency of the three phase power signal is in the range 20-60 Hz. In an embodiment, the frequency of the AC power signal is in the range 2-5 KHz.

In an embodiment, the method includes the step of collecting data at the sub-surface location, the data being transmitted as the data signal.

In an embodiment, the AC power signal and data signals on each conductor are identical. In this way, for a three conductor cable, for example, isolating one conductor still provides two conductors on which the data and power can be transmitted. Additionally, even if two conductors are isolated, an AC power signal can still reach the gauges down hole and send data signals to the surface.

BRIEF DESCRIPTION OF THE DRAWINGS

The present invention will now be described, by way of example only, with reference to the accompanying drawings, in which.

DETAILED DESCRIPTION

One category of down hole equipment is artificial lift systems, for use in wells where there is insufficient pressure in the reservoir to lift the well's fluid (e.g. oil, water or gas) to the surface. Types of artificial lift systems include hydraulic pumps, Rod pumps, Electric Submersible Pumps (ESPs), Jet Pumps, Progressing-Cavity pumps (PCPs) and gas lift.

Figure 1:
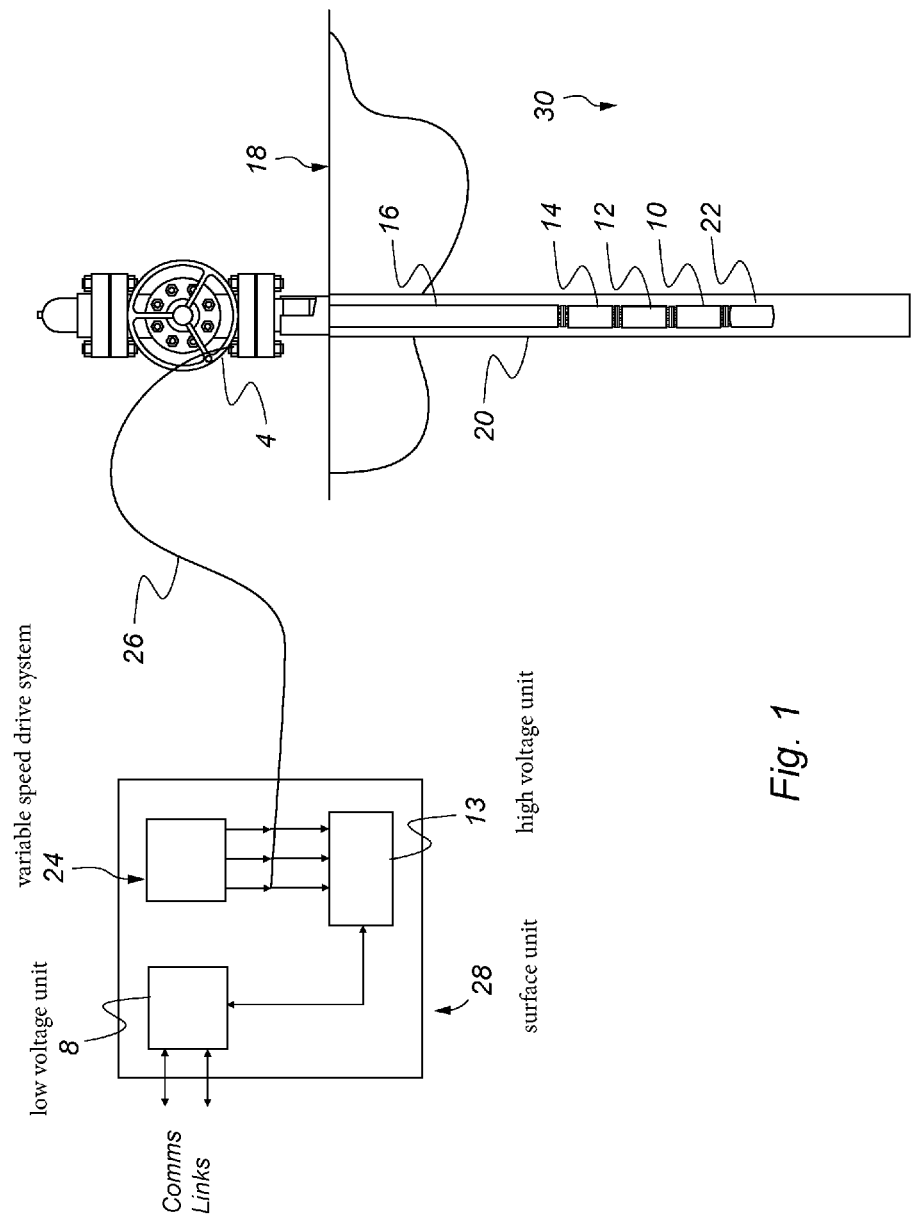
FIG. 1 shows the typical set up of a down hole equipment in a well, showing the positions of the equipment, the motor and the control interfaces at the surface.

Reference is initially made to FIG. 1 of the drawings which illustrates a typical ESP completion in a wellbore. An ESP motor 10 is coupled through a seal 12 to a centrifugal pump 14 and used to lift the fluids through a tubing 16 to a surface 18 of the well 20 in a manner known to those skilled in the art. In order to monitor the operation, sensors or gauges 22 are located below the ESP 10. Typically, the motor 10 is a three phase Y configuration. The motor is driven by a variable speed drive system 24 and is connected via a three phase power cable 26 having three connectors. The system can be considered to comprise two distinct parts, a surface system, generally indicated by reference numeral 28, and a down hole system, generally indicated by reference numeral 30. These two parts 28,30 communicate using the ESP power cable 26.

Surface equipment relating to the gauge system is shown in FIG. 1 where there is a HV unit 13 connected directly to the three phase power supply and to the down hole motor. There is a further LV or low voltage unit 8 which is safely isolated from the high voltage system. The LV system is primarily for data recovery and processing and data display etc. The HV unit is used to inject AC power and also make recovery of raw data from the three phase power system.

Figure 2:
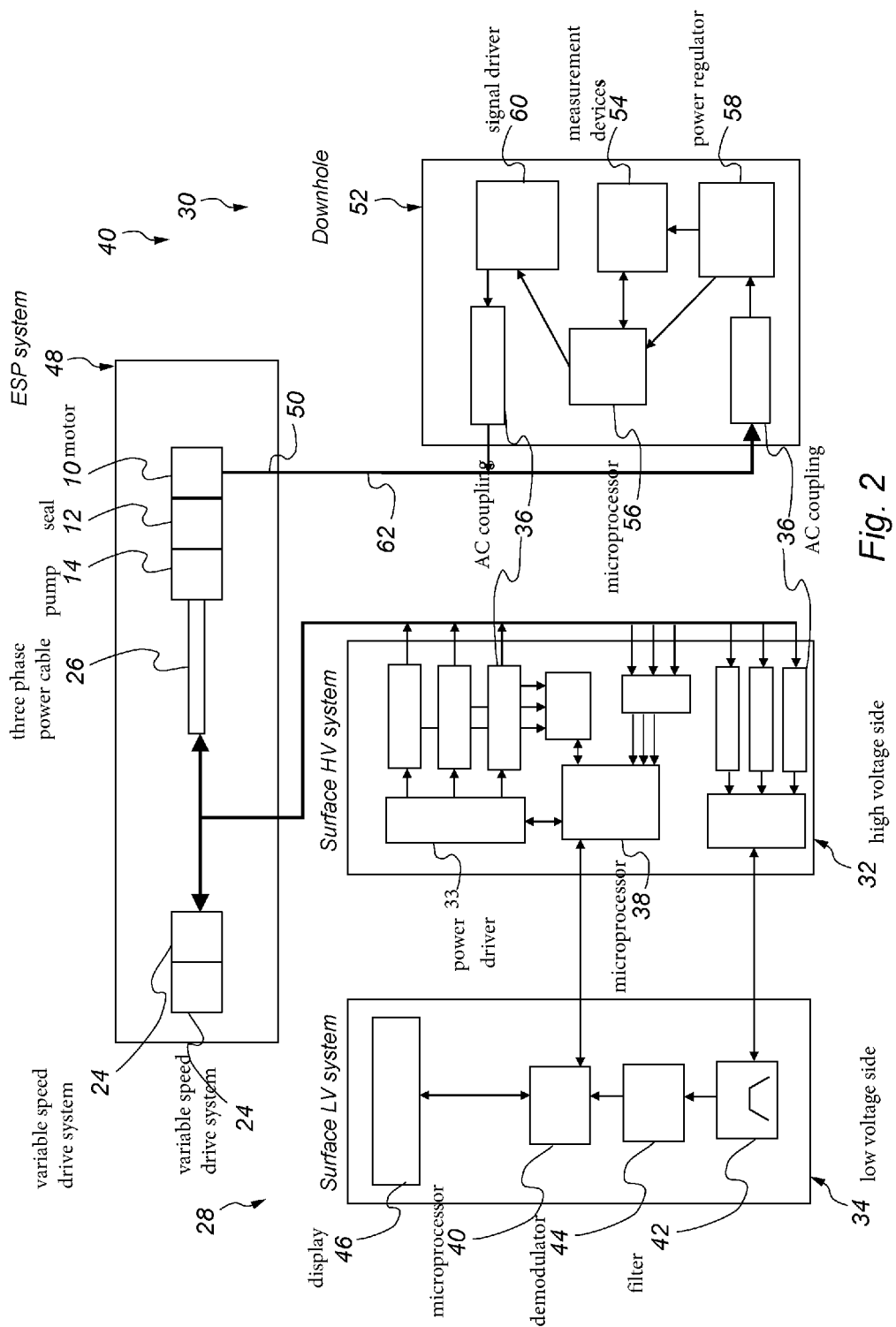
FIG. 2 shows a schematic block diagram of a data communication system according to a first embodiment of the present invention.

Referring now to FIG. 2 of the drawings there is illustrated a functional block diagram of a data transmission system, generally indicated by reference numeral 40, according to an embodiment of the present invention. In this arrangement data can be transmitted onto the three phase power cable 26 in either direction between the surface equipment 28 and subsurface or down hole equipment 30.

At surface 28 the equipment is divided into a high voltage side 32 and a low voltage side 34. The high voltage side 32 provides the power to the down hole system 30. Tuned high-voltage AC coupling 36 is used to connect to each of the phases in the power cable 26. Thus a tripling of circuitry is used in the high-voltage equipment 32. A microprocessor 38 controls the power distribution on to the three-phase cable 26 and is linked to a corresponding microprocessor 41 on the low voltage side 34. Additionally the high-voltage side 32 uses tuned high-voltage AC coupling 35c, in parallel to pick off the data signals on the three-phase cable 26. These signals are then filtered 42 and de-modulated 44 by known methods. Data signals then pass via the microprocessor 41 for display 46 or transport to a data logger or SCADA system. Additionally, the process can work in reverse where microprocessor 41 provides data on to the power lines 26 via the tuned high-voltage AC coupling 36 on the high-voltage side 32 as is known in the art. This can be achieved by modulation of the power frequency with a data pattern (FM), it could also be achieved with amplitude modulation of the power supply, and can be further enhanced by start and stop sequences of different amplitude and/or frequency to indicate start and end of messages. Frequency of surface power could be sequenced through a particular frequency pattern to differentiate the commands from normal power frequency adjustments.

Simple communication could be achieved by short interruptions to the power supply creating power pulses, which can be of differing pulse widths (PWM) or alternatively arranged in a particular pattern to signify particular commands. Power interruptions can be long enough to be detected at the down hole location but short enough so that power is not lost at the gauge.

Down hole an ESP system 48 is provided as described herein with reference to FIG. 1. Like parts have the same reference numerals to aid clarity. Below the motor 10 is a standard Y-point connector 50. At the Y-point connector 50 is arranged a down hole system 52. The down hole system 52 provides monitoring in the form of measurement devices sensors or gauges 54, hooked up via a microprocessor 56. Power to drive the gauges 54 is provided via tuned HV AC coupling circuits 37 to a power regulator 58. Similarly, data from the measurement devices 54 is processed in the microprocessor 56. Using a signal driver 60 and tuned HV AC coupling circuits 39, the data is transmitted on to the power line 62 for transmission to the Y-point 50 and onward transmission up the three-phase power cable 26 to the surface units 28.

In the present invention, a first AC power signal is generated at the drive system 24. This is a three phase power signal which is typically large e.g. 2-3000 volts and 70-100 amps and at a low frequency, in the range 20 to 60 Hz. It is used to power the motor 10. A second AC power signal is generated at the power driver 33 in the surface HV system 32. This second AC power signal is modulated with any required data signal and passed onto each of the three conductors of the power cable 26. The second AC power signal is at a single phase in contrast to the three phase first AC power signal. The second AC power signal is of a lower voltage and current with a higher frequency in the range 500 Hz to 5 kHz. The second AC power signal will pass through the wye point 50 and pass into the down hole system 52. A tuned HV AC coupling circuit 37 at the input is tuned to prevent transmission of the first AC power signal which could damage the down hole instrumentation 54. The power regulation circuit 58 will convert the second AC power signal into an appropriate form for powering the instrumentation 54. Using this power, sensors and gauges 54 monitor conditions at and below the motor 10. Data collected from the sensors and gauges 54 is modulated back onto each conductor of the cable 26 for return to the surface.

Figure 3:
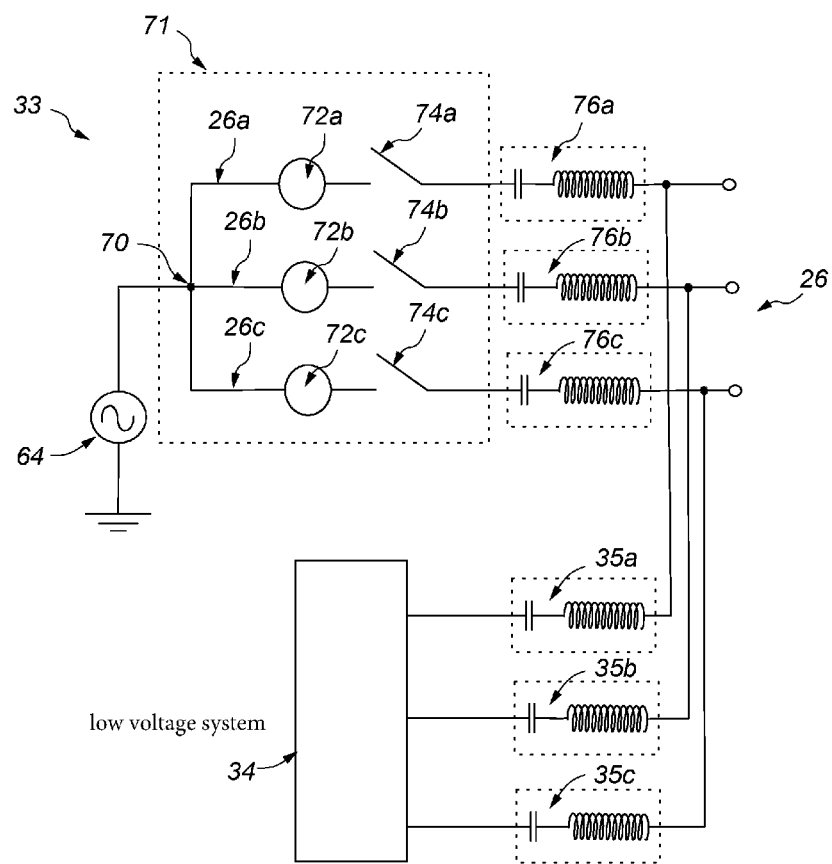
FIG. 3 shows a schematic block diagram of a data communications system surface module according to an embodiment of the present invention.

Reference is now made to FIG. 3 of the drawings which illustrates an isolation unit 71 incorporated in the drive system 33 according to an embodiment of the present invention. Drive system 33 provides the first AC power signal 64 onto the three cable conductors 26a, 26b, 26c of the three phase power cable 26 via a star point 70. This is a three phase supply as is known in the art. Each conductor 26a, 26b and 26c is provided with a current sensor 72a, 72b, 72c, an isolator mechanism 74a, 74b, 74c which in this case are each a relay, and coupling components 76a, 76b, 76c respectively before being input to create high voltage cable connection 26. In addition, to enable signal recovery, the conductors 26a, 26b and 26c each feed into a signal recovery system 34 via independent passive tuned circuits 35a, 35b and 35c respectively. The signal recovery system 35,42,44 may comprise components such as filters, amplifiers and demodulators (not shown) as is appropriate.

In use, a first AC power signal sufficient to power the motor 10, is applied as a voltage at a selected frequency from the drive system 24.

Also coupled to each conductor 26a, 26b, 26c is a second AC power signal, tuned to a second frequency and applied as a voltage from the power driver 33. This is a single phase supply. The surface star point 70 enables the gauge system voltage 64 to be applied to each conductor 26a, 26b and 26c of the cable 26. The current sensors 72a, 72b, 72c measure the current fed into each conductor 26a, 26b, 26c of the cable 26. This second AC power signal is used to drive the gauges and sensors 54 down hole. The voltage applied will be identical on each conductor 26a, 26b, 26c.

Further the surface low voltage system 34 is also connected to each conductor 26a, 26b, 26c via tuned HV coupling circuits 35a, 35b, 35c. System 34 recovers the data from the gauges and sensors 54. The data signal is modulated onto each conductor of the cable 26 downhole, via coupling circuits 39 and demodulated at surface as described herein before with reference to FIG. 2.

If a fault in the ESP power system, such as a fault in the ground insulation, exists, an excessive load can be created on one of the conductors 26a, 26b or 26c. Upon detection of such an excessive load by current sensors 72a, 72b and 72c the associated isolator mechanism 74a, 74b or 74c is activated thus isolating the associated conductor 26a, 26b or 26c which the fault is affecting. In doing so, power is still provided to the sensors and gauges 54 and a data signal is still provided to signal recovery system 34 via the remaining two conductors from 26a, 26b or 26c and sufficient data is carried on the remaining two conductors to enable a data signal to be recovered whilst damage to the ESP system from the occurrence of an excessive load is minimised if not eliminated. Indeed, as the second AC power signal and the data signal is identical on each conductor 26a, 26b, 26c data can still be recovered if only a single conductor is operational. Such data could be important in determining the effect of the fault in the down hole environment.

As the signal recover circuit 34 and power driver 33 are provided with independent passive tuned circuits 76, 35, the power and data signal coupling can be optimised for the frequency in use thus minimising interference between the power and data signal systems ensuring sufficient data signal is present to be recovered and converted into data.

The current sensors 72a, 72b and 72c may further be arranged to detect the occurrence of an insulation fault prior to the actual current levels of the system being affected. The current sensed 73 is also recorded at the microprocessor 38 so that the operation of an isolation mechanism 74a, 74b or 74c is recorded as an alert that a fault has occurred.

Such an isolation unit 71 is of particular use if an insulation fault is low resistance creating a ground short on one conductor effectively. When such a fault occurs, the load across the down-hole signal driver 60 increases thus attenuating the power and recovered data signal resulting in the gauge power failing and/or signal level dropping below a recoverable level. By detecting an effect of the shorting action occurring at the star point 70, the appropriate conductor connection 26a,b, c can be isolated by isolator mechanism 74a, 74b or 74c thus reducing demand on the power supply and improving signal amplitudes and thus recoverable signal.

The principle advantage of the present invention is that it provides a system and method of data transmission over a three phase power system where isolating a conductor on which a system overload or ground fault has occurred can be implemented to protect the system whilst maintaining system operation.

A further advantage of the present invention is that it provides a system and method of data transmission over a three phase power system where system overload or ground fault occurrences are detected and isolation of the associated conductor is actioned to ensure ongoing operation of the system even in fault conditions.

Various modifications may be made to the invention herein described without departing from the scope thereof, for example whilst the isolation mechanism has been detailed as being a relay, it will be appreciated that a solid state switch or other similar component or components may be used.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A data communications system for transmitting data over a three phase power, the data communications system comprising:
   a multi-conductor power cable between a surface and a sub-surface location, wherein the multi-conductor power cable comprises multiple conductors;
   a surface system module provided with a power supply providing an AC power signal coupled to each conductor of the multi-conductor power cable; and
   a sub-surface system module providing a first powered module and a second powered module wherein the second powered module provides a same data communications signal coupled to each conductor,
   wherein the multi-conductor power cable being provided between the surface system module and the sub-surface system module to transmit the AC power signal and the data communications signal, and
   wherein the surface system module comprises an isolation unit configured to selectively isolate each conductor affected by a fault of the multi-conductor power cable upon detection of the fault such that the data communications signal is recovered from at least one conductor that is unaffected by the fault.

2. The data communications system according to claim 1, wherein the isolation unit comprises an isolation device on each conductor.

3. The data communications system according to claim 2, wherein each isolation device is a relay.

4. The data communications system according to claim 1, wherein the isolation unit comprises a detection mechanism configured to detect a system fault.

5. The data communications system according to claim 4, wherein the detection mechanism is further configured to activate the isolation devices.

6. The data communications system according to claim 4, wherein the detection mechanism comprises a current sensor on each conductor.

7. The data communications system according to claim 1, wherein the isolation unit comprises a tuned circuit on each conductor.

8. The data communications system according to claim 1, wherein the sub-surface module comprises a tuned circuit on the motor Y-point to isolate the sub surface module from a three phase power signal.

9. The data communications system according to claim 1, wherein the first powered module is a motor assembly.

10. The data communications system according to claim 9, wherein the first powered module is an ESP motor system.

11. The data communications system according to claim 1, wherein the second powered module is a monitoring system.

12. The data communications system according to claim 11, wherein the monitoring system comprises one or more gauges/sensors, and the data communication signal comprises data from the one or more gauges/sensors.

13. The data communications system according to claim 1, wherein a three phase power signal is used to power the first powered module, and the AC power signal is used to power the second powered module.

14. The data communications system according to claim 1, wherein a frequency of a three phase power signal is in the range of 20 Hz-60 Hz.

15. The data communications system according to claim 1, wherein a frequency of the AC power signal is in the range of 2 KHz-5 KHz.

16. The data communications system according to claim 1, wherein the AC power signal and the data communications signal on each phase are identical.

17. A method of data transmission for transmitting data over a three phase power system between a surface and a sub-surface location, the method comprising:
   (a) providing a three phase power multi-conductor cable connection from the surface to the sub-surface system, the three phase multi-conductor cable comprising multiple conductors;
   (b) coupling an AC power signal equally to each conductor of the three phase power multi-conductor cable connection;
   (c) coupling a same data signal to each conductor of the three phase power multi-conductor cable connection;
   (d) selectively isolating a conductor affected by a fault of the three phase power multi-conductor cable connection upon detection of the fault; and
   (e) recovering the data communications signal from at least one conductor that is unaffected by the fault.

18. The method of data transmission according to claim 17, further comprising determining a fault on each conductor.

19. The method of data transmission according to claim 18, further comprising isolating a conductor in response to the fault determination.

20. The method of data transmission according to claim 17, further comprising monitoring current on each conductor.

21. The method of data transmission according to claim 17, further comprising tuning the frequency of the AC power supply to be different from the frequency of a three phase power.

22. The method of data transmission according to claim 21, further comprising tuning the frequency of the three phase power signal in the range of 20 Hz-60 Hz.

23. The method of data transmission according to claim 21, further comprising tuning the frequency of the AC power signal in the range of 2 KHz-5 KHz.

24. The method of data transmission according to claim 17, further comprising collecting data at the sub-surface location, the data being transmitted as the data signal.

25. The method of data transmission according to claim 17, wherein the AC power signal and the data signal on each conductor are identical.

\* \* \* \* \*